United States Patent
Lee

(10) Patent No.: US 11,922,065 B2
(45) Date of Patent: *Mar. 5, 2024

(54) MEMORY SYSTEM AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,071

(22) Filed: Oct. 25, 2021

(65) Prior Publication Data
US 2022/0043606 A1    Feb. 10, 2022

Related U.S. Application Data

(63) Continuation of application No. 16/717,094, filed on Dec. 17, 2019, now Pat. No. 11,157,211.

(30) Foreign Application Priority Data

Apr. 26, 2019    (KR) .......................... 10-2019-0049216

(51) Int. Cl.
G06F 3/06    (2006.01)
(52) U.S. Cl.
CPC .......... *G06F 3/0659* (2013.01); *G06F 3/0604* (2013.01); *G06F 3/0653* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 9,785,550 B1* | 10/2017 | Kim | G06F 12/0246 |
| 2012/0239990 A1* | 9/2012 | Mataya | G06F 12/1009 |
| | | | 714/704 |
| 2019/0129655 A1* | 5/2019 | Lee | G11C 16/3413 |
| 2020/0042225 A1* | 2/2020 | Oh | G06F 3/061 |

FOREIGN PATENT DOCUMENTS

| | | |
|---|---|---|
| JP | 2012-146129 A | 8/2012 |
| KR | 10-2015-0140496 A | 12/2015 |

OTHER PUBLICATIONS

Office Action for the Korean Patent Application No. 10-2019-0049216 issued by the Korean Intellectual Property Office dated Sep. 11, 2023.

* cited by examiner

*Primary Examiner* — Idriss N Alrobaye
*Assistant Examiner* — Dayton Lewis-Taylor
(74) *Attorney, Agent, or Firm* — IP&T GROUP LLP

(57) ABSTRACT

A memory system includes a memory device and a controller suitable for controlling the memory device based on read counts for a plurality of pages of the memory device, wherein the controller counts at least one of the read counts in response to a read request, determines whether there is a page whose read count is initialized at every check-pointing period to generate a determination result, and controls the memory device to update the read counts based on the determination result.

20 Claims, 9 Drawing Sheets

MEMORY SYSTEM AND OPERATING METHOD THEREOF

CROSS-REFERENCE TO RELATED APPLICATIONS

This application is a continuation of U.S. patent application Ser. No. 16/717,094 filed on Dec. 17, 2019, which claims benefits of priority of Korean Patent Application No. 10-2019-0049216 filed on Apr. 26, 2019. The disclosure of each of the foregoing application is incorporated herein by reference in its entirety.

BACKGROUND

1. Field

Various embodiments of the present invention relate to a memory system and a method for operating the same, and more particularly, to a memory system capable of improving data processing efficiency, and a method for operating the memory system.

2. Description of the Related Art

The computer environment paradigm has been transitioning to ubiquitous computing, which enables computing systems to be used anytime and anywhere. As a result, the use of portable electronic devices such as mobile phones, digital cameras, and laptop computers has rapidly increased. These portable electronic devices generally use a memory system having one or more memory devices for storing data. The memory system may be used as a main memory device or an auxiliary memory device of a portable electronic device.

Since the memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a memory system capable of efficiently processing system data.

In accordance with an embodiment of the present invention, a memory system includes: a memory device; and a controller suitable for controlling the memory device based on read counts for a plurality of pages of the memory device, wherein the controller counts at least one of the read counts in response to a read request, determines whether or not there is a page whose read count is initialized at every check-pointing period to generate a determination result, and controls the memory device to update the read counts into the memory device based on the determination result.

In accordance with another embodiment of the present invention, a memory system includes: a memory device; and a controller suitable for controlling the memory device based on read counts for a plurality of pages of the memory device, wherein the controller counts at least one of the read counts of each page of the memory device in response to a read request, generates a determination result by determining whether a read reclaim request is queued to a reclaim queue at every check-pointing period, and controls the memory device to update the updated read count based on the determination result.

In accordance with yet another embodiment of the present invention, a memory system includes: a memory device; and a controller suitable for controlling the memory device based on read counts for a plurality of pages of the memory device, wherein the controller counts at least one of the read count of each page of the memory device in response to a read request, generates a determination result by determining whether a read reclaim request is provided to the memory device at every check-pointing period, and controls the memory device to update the read counts based on the determination result.

In accordance with still another embodiment of the present invention, a memory system includes: a memory device including a plurality of memory blocks, each including a plurality of pages; and a controller suitable for controlling a read count for a first page, performing an erase operation or a read reclaim operation based on the read count, initializing the read count when the erase operation or the read reclaim operation involved in the first page is performed, and programming the read count in the memory device when the read count is initialized.

DETAILED DESCRIPTION

Figure 1:
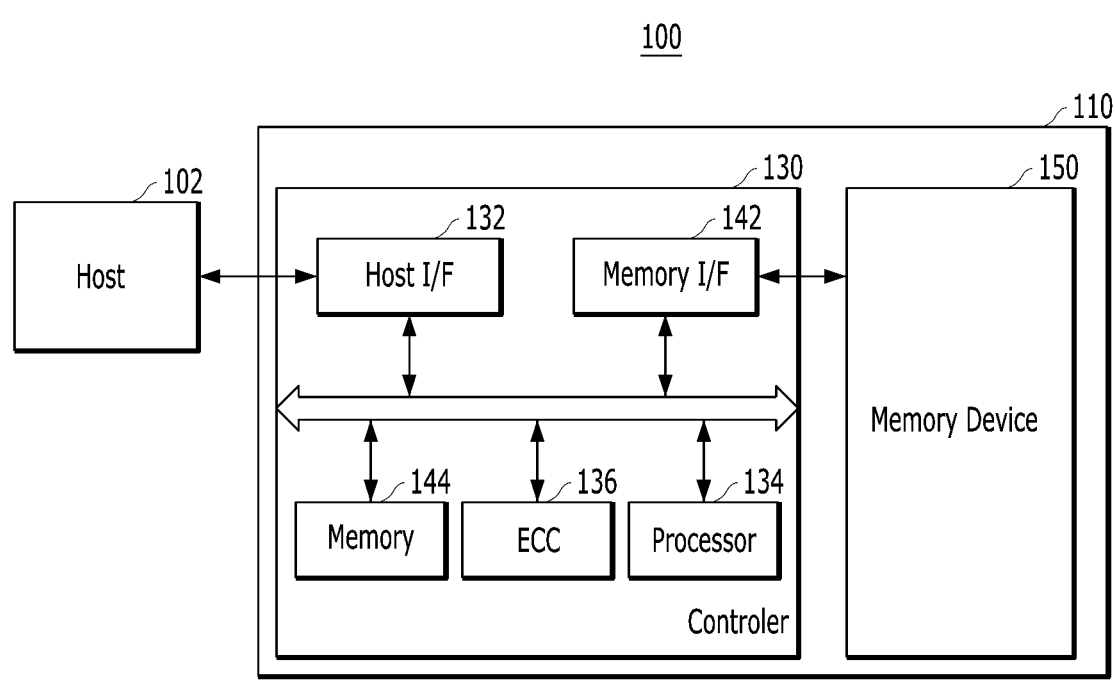
FIG. 1 is a block diagram illustrating a data processing system including a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereafter, the following embodiments of the present invention will be described in detail with reference to the accompanying drawings.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. By way of example but not limitation, examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device. By way of example but not limitation, application examples of the memory system 110 may be one of various components constituting a computer system (a computer, a smart phone and a portable game machine).

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks, each including a plurality of pages, each including a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a memory I/F 142, and a memory 144. Although not shown in drawings, the controller 130 may further include a power management unit (PMU) capable of providing and managing power of the components included in the controller 130.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host 102.

The ECC component 136 may correct a failure bit of data processed in the memory device 150, and the ECC component 136 may include an ECC encoder and an ECC decoder.

The ECC encoder may perform an error correction encoding operation on the data to be programmed in the memory device 150 to generate data with a parity bit added thereto. The data with the parity bit added thereto may be stored in the memory device 150. The ECC decoder may detect and correct the failure bit included in the data which is read from the memory device 150 when reading the data stored in the memory device 150.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to any specific structure. The ECC component 138 may include all circuits, modules, systems or devices for error correction.

The processor 134 may control the overall operations of the memory system 110. The processor 134 may drive firmware to control the overall operations of the memory system 110.

The firmware may be referred to as flash translation layer (FTL). Also, the processor 134 may be realized as a microprocessor or a central processing unit (CPU).

Also, the controller 130 may perform a background operation on the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

The memory 144 may serve as a working memory of the memory system 110 and the controller 130, and store data for driving the memory system 110 and the controller 130.

The memory 144 may be embodied by a volatile memory. For example, the memory 144 may be embodied by static random access memory (SRAM) or dynamic random access memory (DRAM). The memory 144 may be disposed within or outside of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host and the memory device 150 and data when the data write/read operation is performed. In order to store such data, the memory 144 may include a program memory, data memory, write buffer/cache, read buffer/cache, data buffer/cache, map buffer/cache or the like.

Figure 2:
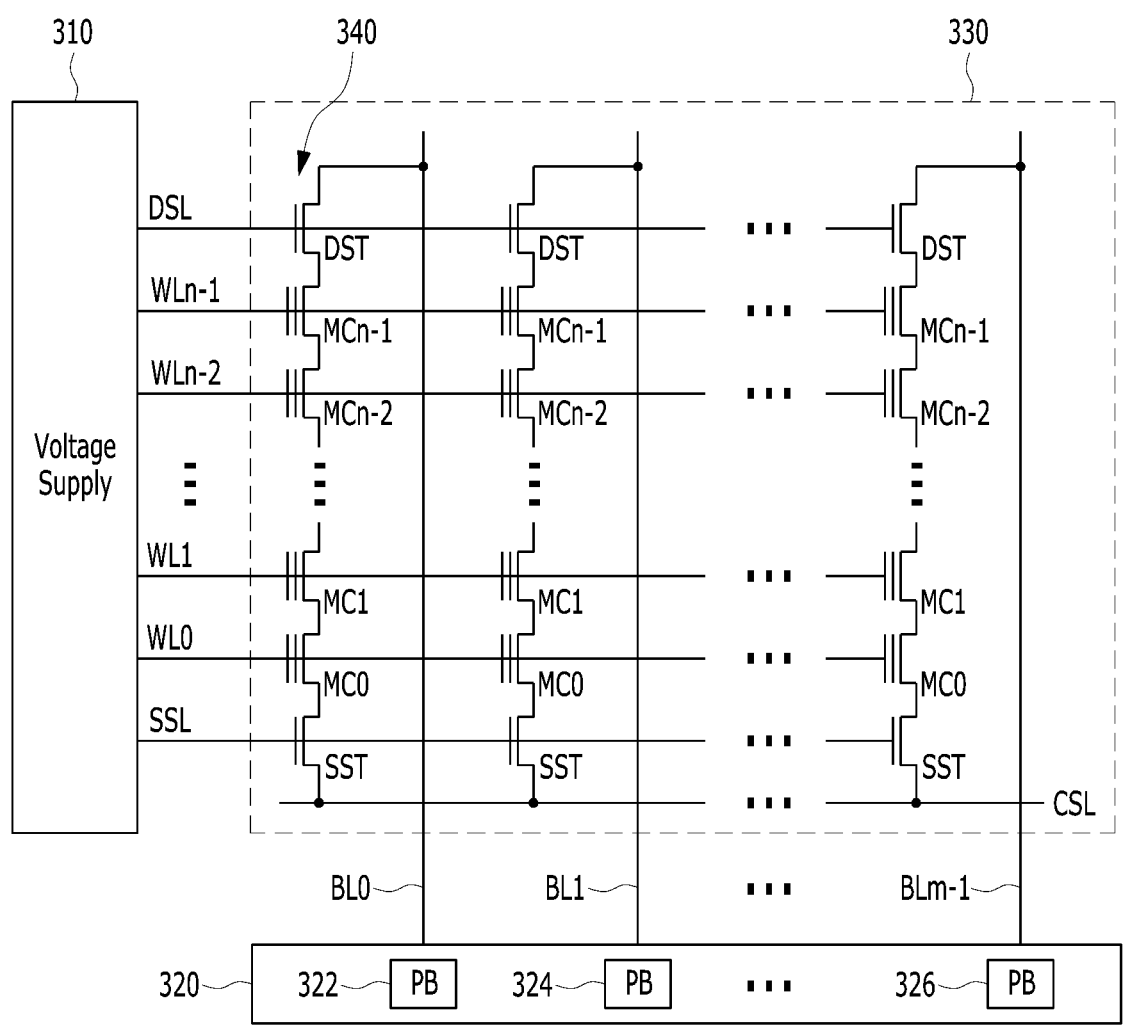
FIG. 2 is a schematic diagram illustrating a configuration of a memory device employed in the memory system of FIG. 1.

FIG. 2 is a schematic diagram illustrating the memory device 150.

Referring to FIG. 2, the memory device 150 may include a plurality of memory blocks. Each of the memory blocks may include a plurality of pages, for example 2M pages, the number of which may vary according to circuit design. For example, in some applications, each of the memory blocks may include M pages. Each of the pages may include a plurality of memory cells that are coupled to a word line WL.

Memory cells included in the respective memory blocks may be one or more of a single level cell (SLC) storing 1-bit data, or a multi-level cell (MLC) storing 2 or more bits of data. Hence, the memory device 150 may include SLC memory blocks or MLC memory blocks, depending on the number of bits which can be expressed or stored in each of the memory cells in the memory blocks. In an embodiment, the memory device 150 may include a plurality of Triple Level Cell (TLC) memory blocks. In yet another embodiment, the memory device 150 may include a plurality of Quadruple Level Cell (QLC) memory blocks. The TLC memory block may include a plurality of pages which are embodied by memory cells each capable of storing 3-bit data, the QLC memory block may include a plurality of pages which are embodied by memory cells each capable of storing 4-bit data.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-M RAM).

A memory block 330 in the memory device 150 of the memory system 110, may include a plurality of cell strings 340 coupled to a plurality of corresponding bit lines BL0 to BLm−1. The cell string of each column may include one or more drain select transistors DST and one or more source select transistors SST. Between the drain and source select transistors DST, SST, a plurality of memory cells or memory cell transistors MC0 to MCn−1 may be coupled in series. In an embodiment, each of the memory cells MC0 to MCn−1 may be embodied by an MLC capable of storing data information of a plurality of bits. Each of the cell strings may be electrically coupled to a corresponding bit line among the plurality of bit lines BL0 to BLm−1. For example, the first cell string is coupled to the first bit line BL0, and the last cell string is coupled to the last bit line BLm−1.

Although FIG. 2 illustrates NAND flash memory cells, the invention is not limited to this configuration. It is noted that the memory cells may be NOR flash memory cells, or hybrid flash memory cells including two or more types of memory cells combined therein. Also, it is noted that the memory device 150 may be a flash memory device including a conductive floating gate as a charge trap layer or a charge trap flash (CTF) memory device including an insulation layer as a charge trap layer.

The memory device 150 may further include a voltage supply 310 which provides word line voltages including a program voltage, a read voltage and a pass voltage, to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory device 150 may be embodied by a two-dimensional (2D) or three-dimensional (3D) memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks.

Each memory block 330 included in the memory device 150 may include a plurality of NAND strings NS (not shown) that are extended in the second direction, and a plurality of NAND strings NS that are extended in the first direction and the third direction. Each of the NAND strings NS may be coupled to a bit line BL, at least one drain selection line DSL, at least one source selection line SSL, a plurality of word lines WL, at least one dummy word line DWL (not shown), and a common source line CSL, and each of the NAND strings NS may include a plurality of transistor structures.

In short, each memory block 330 of the memory device 150 may be coupled to a plurality of bit lines BL, a plurality of drain selection lines DSL, a plurality of source selection lines SSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a drain selection transistor DST of each NAND string NS may be coupled to a corresponding bit line BL, and a source selection transistor SST of each NAND string NS may be coupled to a common source line CSL. Memory cells MC may be provided between the drain selection transistor DST and the source selection transistor SST of each NAND string NS. In other words, a plurality of memory cells may be realized in each memory block 330 of the memory device 150.

Figure 3:
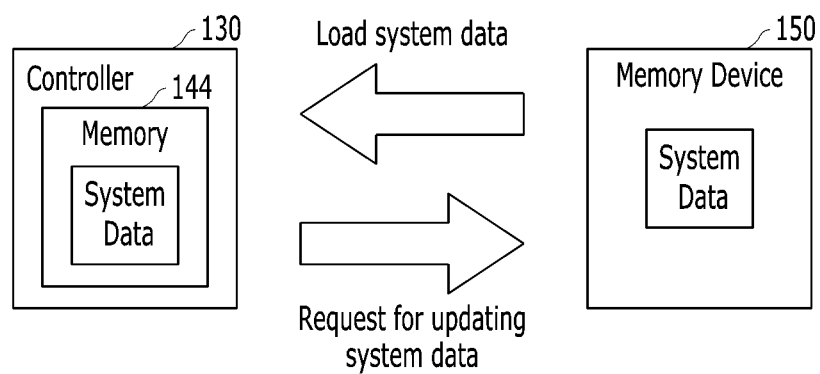
FIG. 3 is a block diagram illustrating a memory system in accordance with an embodiment of the present invention.

FIG. 3 is a block diagram illustrating a memory system 110 in accordance with an embodiment of the present invention.

System data is a type of data that the memory system 110 uses to perform system operations. The system data may include configuration information of the memory device 150, which includes super block information, bad block information, map information, and read count information.

The configuration information of the memory device 150 may include information such as the number of dies included in the memory device 150, the number of channels, the number of planes, the number of blocks, and the number of pages. The super block information may be information of a super block. For example, the super block information may include information on the blocks which are currently used as a super block and the blocks which are not used as a super block. The bad block information may be information indicating a bad block included in the current memory device 150. The map information may be information indicating the location where the map is stored in the current memory device 150. The read count information may include read counts on the data currently stored in each of the unit memory regions of the memory device 150. Hereinafter, an embodiment of the present invention will be described by taking a case where the read counts are stored for a plurality of pages of the memory device 150 as an example. However, the concept and spirit of the present invention are not limited to this, and the read counts may be stored on a block basis or may be stored on the basis of a page group. The read counts may be counted by the processor 134 shown in FIG. 1, and each of the plurality of pages may have a corresponding read count.

The controller 130 may load the system data from the memory device 150 and store the loaded system data in the memory 144. In particular, when the memory system is booted up, the controller 130 may load the system data from the memory device 150. The controller 130 may update the system data that are changed during a system operation. For example, the controller 130 may monitor a read count for a particular page. The controller 130 may perform a read operation on the data stored in the particular page and then change the system data to reflect the increased read count for the particular page. The controller 130 may then provide the memory device 150 with a program request to update the changed system data. The memory device 150 may program the system data based on the changed system data and the program request that are provided from the controller 130. In other words, the memory device 150 may process the previously stored system data as invalid data and process the newly provided updated system data as valid data.

Since the system data are type of data required for the operation of the memory system 110, the system data may be stored in the memory device 150 so that the system data are not volatilized even when the power supply to the memory system 110 is interrupted. When the controller 130 provides a program request to update system data to the memory device 150 at a short or long check-pointing cycle, performance or reliability of the memory system 110 may be deteriorated. For example, when the controller 130 provides a program request to the memory device 150 at a short cycle, write operations may be performed frequently in the memory device 150 which deteriorate the performance of the memory system 110. Conversely, when the controller 130 provides a program request to the memory device 150 at a long cycle, the system data may not be used for the memory device 150 in a timely manner. When the memory system 110 is terminated with no recent system data stored in the memory device 150, the changed system data may be volatilized. When the memory system 110 performs a system operation based on the system data before being updated, the reliability of the memory system 110 may be deteriorated.

According to an embodiment of the present invention, the controller 130 may program the changed system data only when a predetermined condition is satisfied at the check-pointing cycle, instead of programing the changed system data at every check pointing cycle. The controller 130 may determine whether the system data need to be programmed into the memory device 150 at every check-pointing cycle and provides a program request for the changed system data to the memory device 150 based on a determination result. When it is determined that the system data are required to be programmed into the memory device 150 but programming the system data fails or is performed at long intervals, a probability that the system data are volatilized and thus the memory system 110 malfunctions when operated based on the previous system data may be increased. For example, an erase operation of a memory block is performed and the read counts of the pages included in the memory block may be initialized. When the initialized read counts are volatized, i.e., not programmed in the memory device 150, an unnecessary read reclaim operation may be performed on the erased pages of the memory block based on the read counts not being initialized.

Hereinafter, a moment when a program request to update the changed system data is provided in accordance with an embodiment of the present invention will be described with reference to FIG. 4A to FIG. 6. In FIGS. 4A to 6, an operation of the memory system 110 is described by taking as an example the read count information among the system data.

Figure 4A:
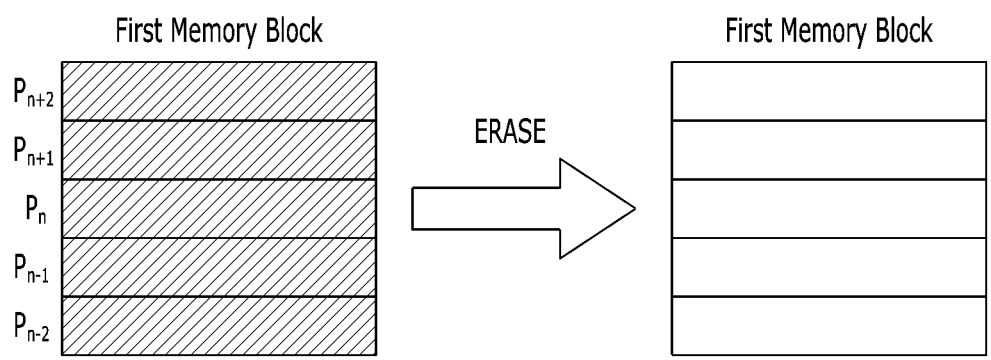
FIG. 4A illustrates an erase operation in accordance with an embodiment of the present invention.

FIG. 4A illustrates an erase operation in accordance with an embodiment of the present invention.

The controller 130 may provide the memory device 150 with an erase request to perform an erase operation on a memory block which includes only invalid data.

The memory device 150 may erase all the data stored in a specific memory block in response to an erase request of the controller 130. The erase operation may be performed on the basis of a memory block, which is different from a read operation and a write operation.

Referring to FIG. 4A, the memory device 150 may erase all of the data stored in a plurality of pages $P_{n-2}$, $P_{n-1}$, $P_n$, $P_{n+1}$, $P_{n+2}$ of a first memory block in response to an erase request of the controller 130.

Herein, since all of the data are stored in each of the plurality of pages $P_{n-2}$, $P_{n-1}$, $P_n$, $P_{n+1}$, $P_{n+2}$ included in the first memory block, the processor 134 may count read counts corresponding to each of the pages to '0'. Since the read counts of the pages have significantly changed due to the erase operation, if the changed read counts are not programmed into the memory device 150 but are volatized, the memory system 110 may malfunction. Accordingly, the controller 130 may determine whether or not there is a page whose read count is initialized at the check-pointing moment, and program the read count information including the read counts stored for a plurality of pages of the memory device 150 into the memory device 150 based on the determination result.

Figure 4B:
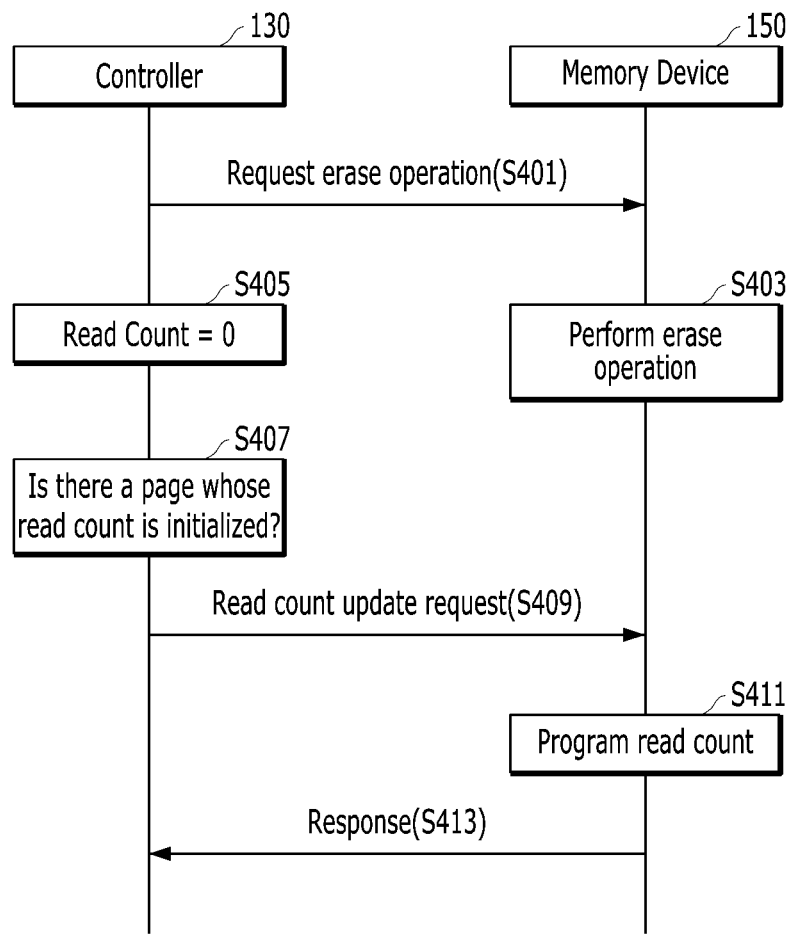
FIG. 4B describes a procedure of an erase operation in accordance with an embodiment of the present invention.

FIG. 4B shows a procedure describing an operation of the memory system 110 in accordance with an embodiment of the present invention.

In step S401, the controller 130 may provide the memory device 150 with an erase request for a target memory block upon the request of the host 102.

In step S403, the memory device 150 may perform the erase operation, e.g., erase all of the data stored in the target memory block.

In step S405, the controller 130 may initialize read counts to '0' corresponding to each of the pages included in the target memory block.

Step S407 shows the operation of the controller 130 at a check-pointing moment. In the step S407, the controller 130 may be able to determine whether there is a page whose read count is initialized after a previous check-pointing moment. In the example of FIG. 4B, the read counts for pages in a specific memory block which the erase operation is performed in may be initialized in the step S405.

In the step S409, the controller 130 may provide the memory device 150 with a read count update request to update the read count information loaded in the memory 144.

In step S411, the memory device 150 may program the read count information according to a read count update request provided from the controller 130.

In step S413, the memory device 150 may provide the controller 130 with a program completion response in response to the read count update request.

FIGS. 5A to 5F illustrate a reclaim operation in accordance with an embodiment of the present invention.

Figure 5A:
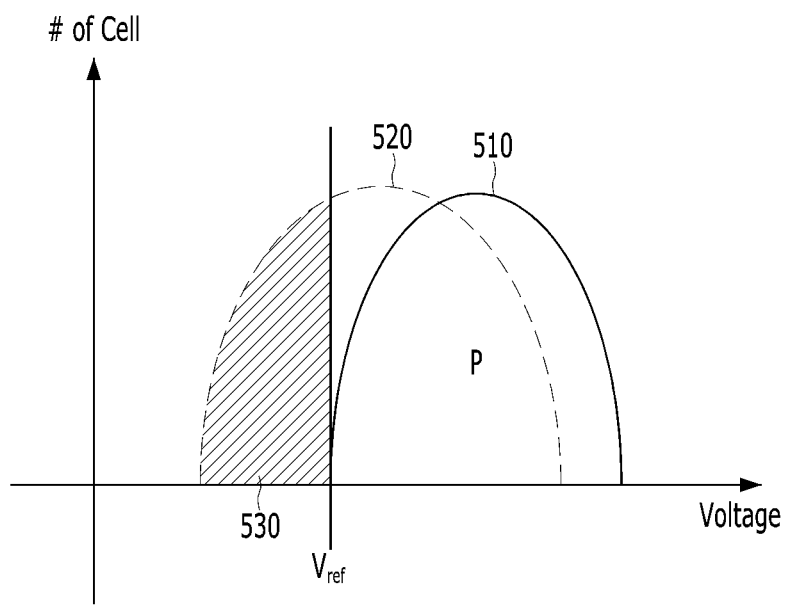
FIG. 5A is a graph illustrating a charge loss phenomenon of a single level cell (SLC).

FIG. 5A is a graph illustrating a charge loss phenomenon of a single level cell (SLC).

The charge loss phenomenon may represent a phenomenon that all or part of the electrons trapped in a charge trap layer (for example, a floating gate) or a tunnel oxide layer of the memory device 150 are released from the charge trap layer as time passes. As the amount of charges trapped in the charge trap layer is decreased, a threshold voltage of the memory cell may be changed.

Referring to FIG. 5A, the x-axis represents a level of voltage, and the y-axis represents the number of memory cells. A first program state distribution 510 may represent a program state distribution right after a program operation is performed in a plurality of memory cells. A second program state distribution 520 may show a program state distribution according to the charge loss phenomenon which occurs as time passes after the program operation. In other words, as the charge loss phenomenon occurs, the first program state distribution 510 may be moved to the second program state distribution 520. Thus, the first program state distribution 510 may be positioned to the right of a reference voltage Vref, e.g., threshold voltages of all programmed memory cells are larger than the reference voltages Vref, while a partial distribution 530 of the second program state distribution 520 may be positioned to the left of the reference voltage Vref, e.g., threshold voltages of some programmed memory cells are less than the reference voltages Vref. As the number of memory cells corresponding to the partial distribution 530 of the second program state distribution 520 increases, the memory cells included in the partial distribution 530 may not be corrected by the ECC component 136.

Uncorrectable ECC (UECC) may occur when the number of error bits included in the read data may not be corrected by the ECC component 136. When a long time passes after data are programmed into the memory cells of the memory device 150, the number of error bits of the data stored in the same page for the long time may increase, which may result in the occurrence of UECC. The phenomenon that the UECC occurs may be referred to as retention decline.

In order to prevent the UECC from occurring, an operation of migrating the data stored in a page which may be deteriorated due to the retention decline (which may also be referred to as a target page) into another healthy page (which may also be referred to as a destination page) may be performed in the memory system 110. This operation may be called a reclaim operation.

Figure 5B:
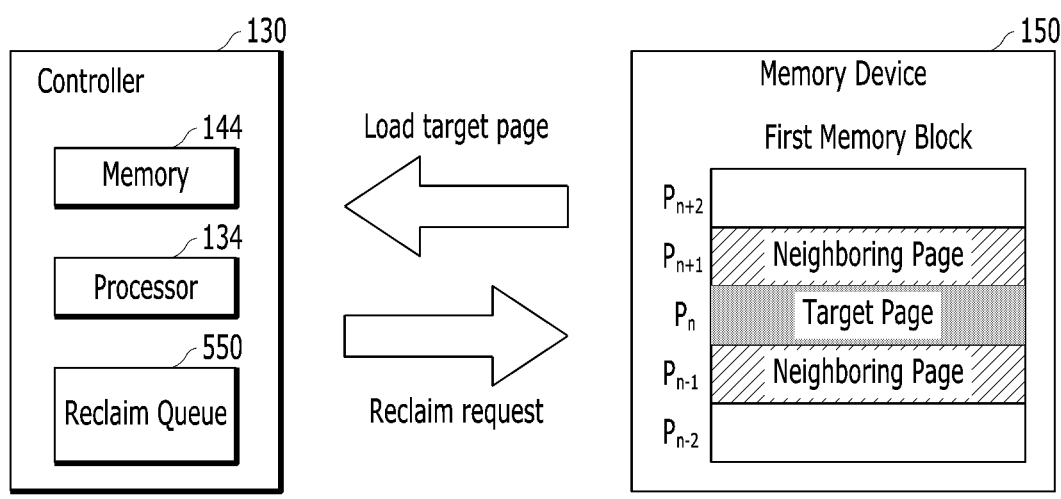
FIG. 5B is a block diagram illustrating a schematic structure of a memory system in accordance with an embodiment of the present invention.

FIG. 5B is a block diagram illustrating a schematic structure of the memory system 110 in accordance with an embodiment of the present invention.

As illustrated in FIG. 3, the memory 144 may load read count information. The processor 134 may then monitor the read counts of the plurality of the pages in the memory device 150.

Furthermore, the controller 130 may further include a reclaim queue 550. Although the reclaim queue 550 is shown in FIG. 5B as an element which is separate from the processor 134, the reclaim queue 550 may be provided as an internal element of the processor 134 according to another embodiment.

The reclaim queue 550 may queue the reclaim request for the page on which a reclaim operation is to be performed under the control of the processor 134. The reclaim request may include information (e.g., address information) about the page on which the reclaim operation is to be performed. In an embodiment, the reclaim queue 550 may process the queued reclaim request according to a First-In First-Out (FIFO) scheme under the control of the processor 134.

The processor 134 may detect a page on which a UECC is likely to occur (which is, hereinafter, referred to as a target page $P_n$) based on the read counts of a plurality of pages $P_{n-2}$, $P_{n-1}$, $P_n$, $P_{n+1}$, $P_{n+2}$. Once a target page $P_n$ is detected, the processor 134 may queue the reclaim request for the target page $P_n$ to the reclaim queue 550.

Figure 5C:
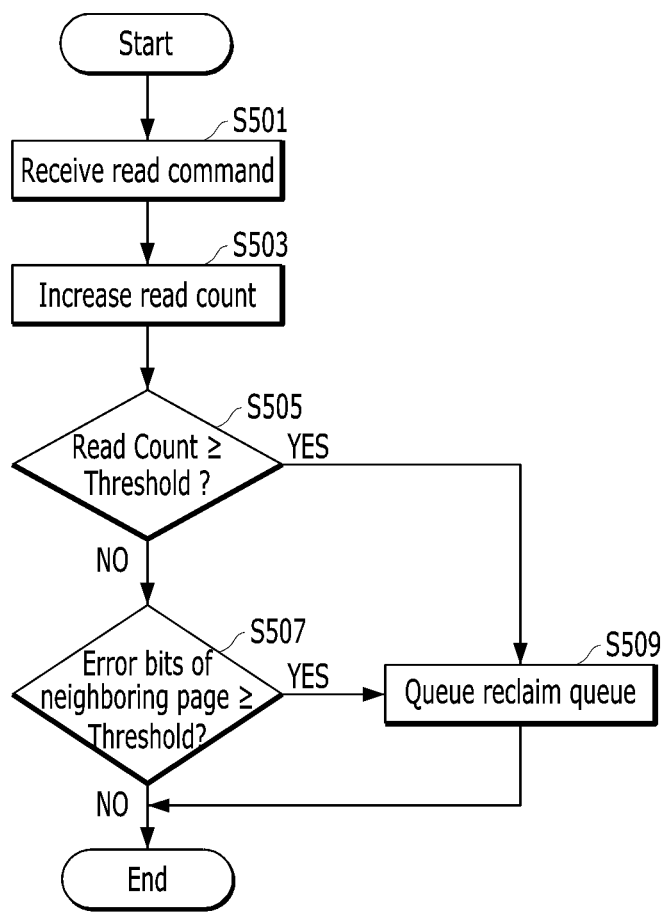
FIG. 5C is a flowchart describing a process of queuing a reclaim request in accordance with an embodiment of the present invention.

Referring to FIG. 5C, the process of the processor 134 queuing a reclaim request to the reclaim queue 550 is described in accordance with an embodiment of the present invention.

In step S501, the controller 130 may receive a read command from the host 102. The controller 130 may receive a logical address corresponding to the read command together with the read command from the host 102.

In step S503, the processor 134 may increase the read count of a page corresponding to the logical address (which may also be referred to as the target page).

In step S505, the processor 134 may determine whether or not the read count corresponding to the target page is equal to or greater than a predetermined threshold value.

When the read count corresponding to the target page is equal to or greater than the predetermined threshold value ('YES' in the step S505), in step S509, the processor 134 may queue a reclaim request for a target page to the reclaim queue 550.

When the read count corresponding to the target page is less than the predetermined threshold value ('NO' in the step S505), in step S507, the processor 134 may use the ECC component 136 to determine whether or not the number of the error bits of a neighboring page disposed adjacent to the target page (which may also be referred to as a neighboring page) is equal to or greater than a predetermined threshold value.

When the number of the error bits read from the neighboring page is equal to or greater than the predetermined threshold value ('YES' at step S507), the processor 134 may queue a reclaim request for the target page to the reclaim queue 550.

The controller 130 may provide the memory device 150 with a reclaim request so that the memory device 150 performs a reclaim operation on the target page in the order queued in the reclaim queue 550. The memory device 150 may perform a reclaim operation on the target page in response to the reclaim request.

Figure 5D:
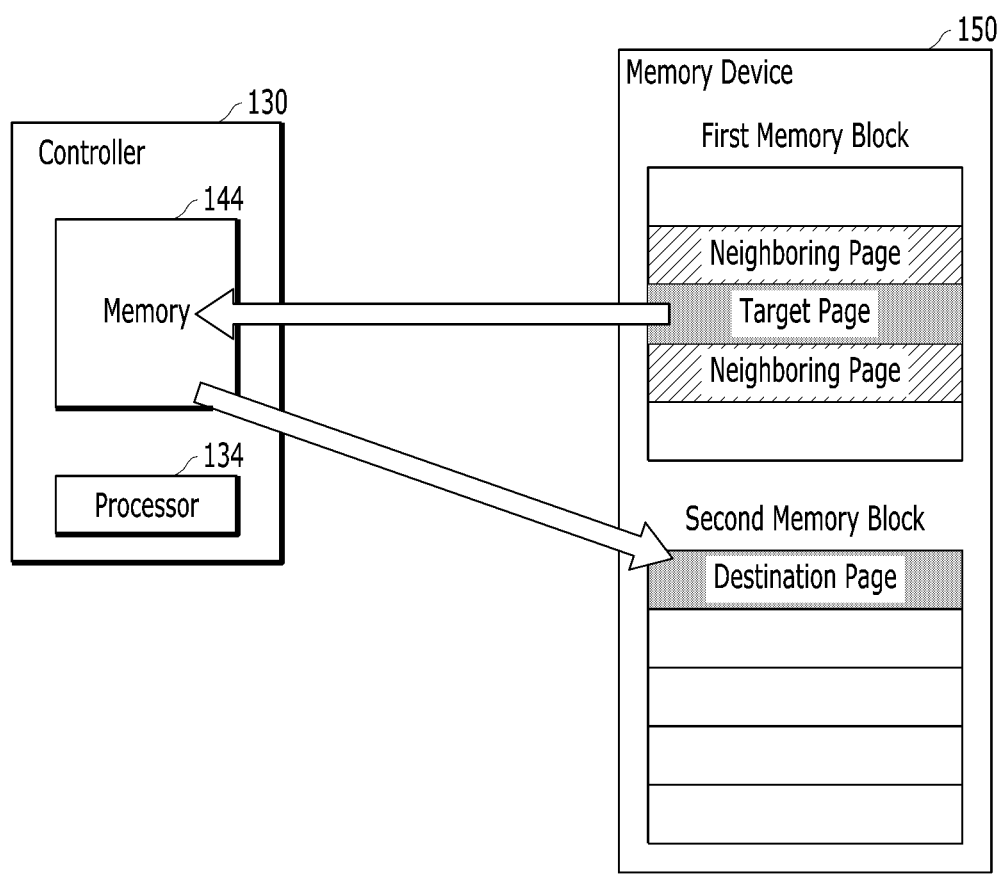
FIG. 5D shows a data migration path in a reclaim operation in accordance with an embodiment of the present invention.

FIG. 5D shows a data migration path in a reclaim operation in accordance with an embodiment of the present invention.

The controller 130 may read and store the data stored in the target page in the memory 144 according to the read command provided from the host 102 under the control of the processor 134. The processor 134 may determine whether it is required to perform a reclaim operation on the target page based on the read count of the target page or the number of the error bits in the neighboring page. When a reclaim operation is required to be performed on the target page, the processor 134 may queue the reclaim request for the target page to the reclaim queue 550.

The controller 130 may then provide the memory device 150 with a reclaim request for the target page. The controller 130 may provide the memory device 150 with the data stored in the target page stored in the memory 144 as well as providing the reclaim request for the target page.

The memory device 150 may then store the data provided from the controller 130 in a destination page, in response to the reclaim request.

The controller 130 may process the data stored in the target page as invalid data and process the data stored in the destination page as valid data by updating map information. The controller 130 may control the memory device 150 to perform an erase operation on a memory block including only invalid data.

Figure 5E:
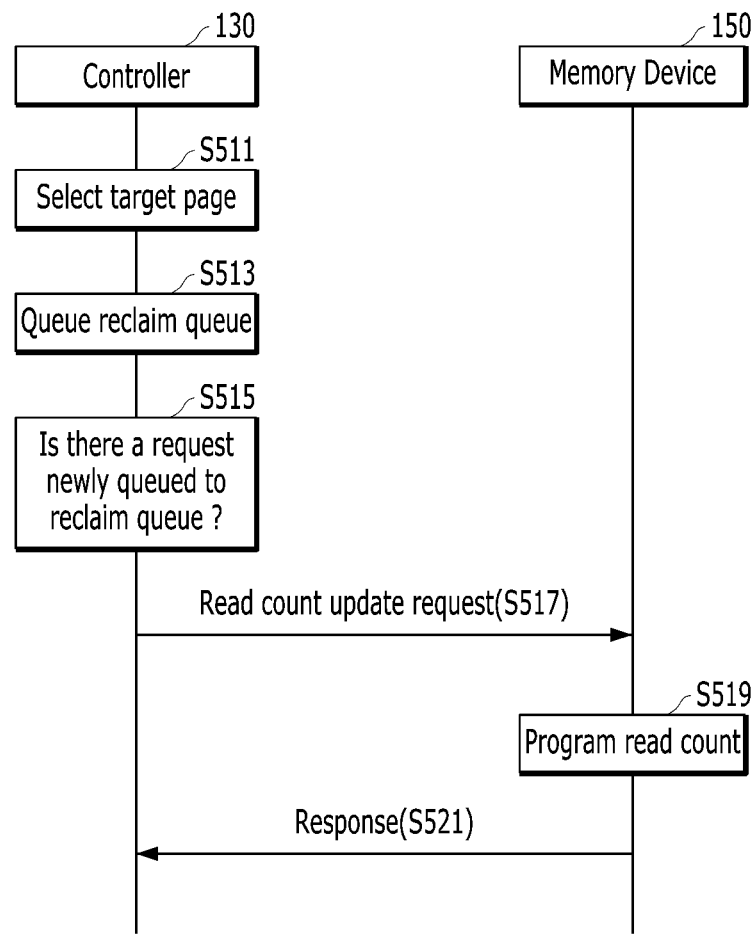
FIG. 5E describes a procedure of an operation of a memory system in accordance with an embodiment of the present invention.

FIG. 5E is a procedure describing an operation of the memory system 110 in accordance with an embodiment of the present invention. Specifically, FIG. 5E illustrates a read count update moment in accordance with an embodiment of the present invention by referring to FIGS. 5B to 5D.

In step S511, the controller 130 may select a target page based on a read count or the number of error bits of a neighboring page.

In step S513, the controller 130 may queue the reclaim request for the target page to the reclaim queue 550.

Step S515 shows an operation of the controller 130 at a check-pointing moment. In step S515, the controller 130 may determine whether there is a request newly queued to the reclaim queue after a previous check-pointing moment. In the example of FIG. 5E, it is assumed that there is a request for a reclaim operation to a specific page, which is newly queued in the reclaim queue (the step S513).

In step S517, the controller 130 may provide the memory device 150 with a read count update request to update the read count information until the current check-pointing moment after the read count is programmed into the memory device 150.

In step S519, the memory device 150 may program the read count information according to the read count update request provided from the controller 130.

In step S521, the memory device 150 may provide the controller 130 with a program completion response in response to the read count update request.

Figure 5F:
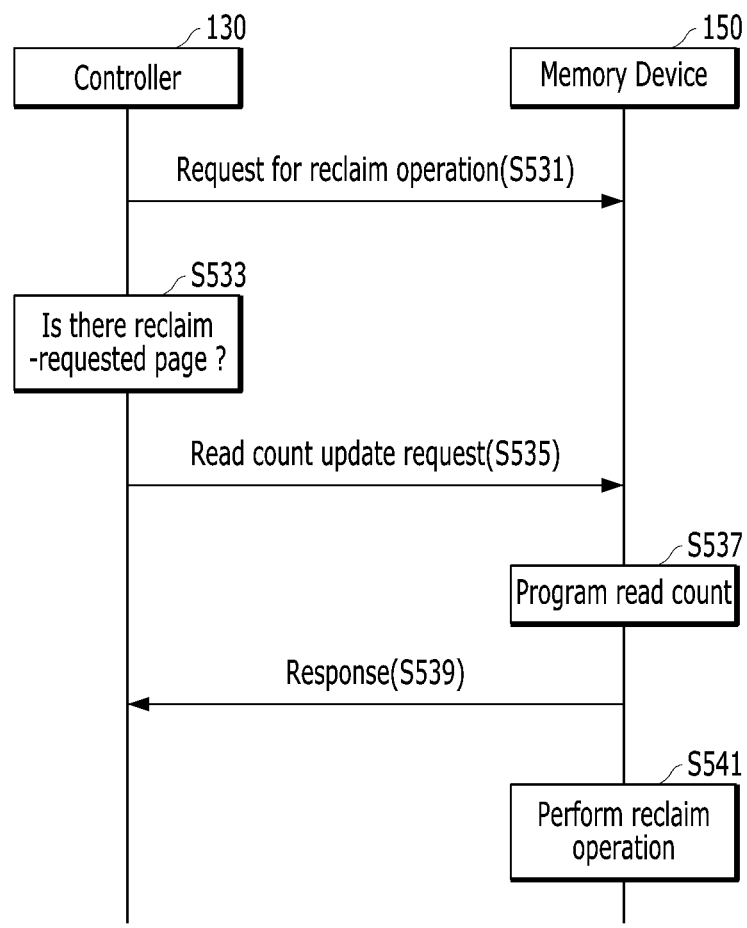
FIG. 5F describes a procedure of an operation of a memory system in accordance with another embodiment of the present invention.

FIG. 5F is a procedure describing an operation of the memory system 110 in accordance with another embodiment of the present invention.

In step S531, the controller 130 may provide the memory device 150 with a reclaim request for a target page based on the order that reclaim requests are queued to the reclaim queue.

Step S533 shows an operation of the controller 130 at a check-pointing moment. In step S533, the controller 130 may determine whether or not there is a page requested for a read reclaim operation after a previous check-pointing moment.

Furthermore, in step S535, the controller 130 may provide the memory device 150 with a read count update request in order to update the read count information.

In step S537, the memory device 150 may program the read count information according to the read count update request provided from the controller 130.

In step S539, the memory device 150 may provide the controller 130 with an update completion response to the read count update request.

In step S541, the memory device 150 may perform a read reclaim operation of the target page in response to the reclaim request from the controller 130.

According to an embodiment of the present invention, the controller 130 may determine whether read count information needs to be programmed into the memory device 150 at every check-pointing cycle, and selectively program the read count information based on the determination result. For example, when the read count information needs to be programmed into the memory device 150 may include at least one of a case where an erase operation is performed after a previous check-pointing moment and a page exists whose read count is initialized, a case where a reclaim request is queued to a reclaim queue, and a case where the queued request is provided to the memory device 150. Instead of programming the read count information into the memory device 150 at every check-pointing cycle, the controller 130 may program the read count information into the memory device 150 when the read count is greatly changed or is likely to be changed after the read count is programmed into the memory device 150.

According to an embodiment of the present invention, it is possible to timely update the read count information while reducing the overload of the memory system 110 by selectively programming the read count information into the memory device 150 at the check-pointing cycle.

According to an embodiment of the present invention, the memory system may efficiently update system data.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
a memory device; and
a controller suitable for controlling the memory device based on read counts for a plurality of unit memory regions of the memory device,
wherein the controller is further suitable for:
determining whether there is a unit memory region whose read count is initialized at every period,
updating the read counts and programming the updated read counts into the memory device when there is a unit memory region whose read count is initialized during a period, and
skipping the updating of the read counts and the programming of the updated read counts into the memory device when there is no unit memory region whose read count is initialized during the period.

2. The memory system of claim 1, wherein when an erase operation is performed on a memory block included in the memory device, the controller initializes a read count for a page included in the memory block.

3. The memory system of claim 2, wherein the controller controls the memory device to perform an erase operation of a memory block including only invalid data.

4. The memory system of claim 3, wherein the controller provides the memory device with a read reclaim request to program data of a page corresponding to the read request, and wherein the page corresponding to the read request is loaded into a memory of the controller into a destination page based on whether or not a read count of the page corresponding to the read request is equal to or greater than a threshold value, and determines the data stored in the page as invalid page.

5. The memory system of claim 1, wherein the unit memory regions include a plurality of pages.

6. The memory system of claim 1, wherein the unit memory regions include a plurality of blocks.

7. The memory system of claim 1, wherein the unit memory regions include a plurality of page groups.

8. A memory system, comprising:
a memory device; and
a controller suitable for controlling the memory device based on read counts for a plurality of unit memory regions of the memory device,
wherein the controller determines whether a read reclaim request is queued to a reclaim queue at every period, updates the read counts when there is a read reclaim request newly queued in the reclaim queue during a period, and skips the update of the read counts when there is no read reclaim request newly queued in the reclaim queue during the period.

9. The memory system of claim 8, wherein when a read count of a page of the memory device corresponding to a read request is equal to or greater than a threshold value, the controller queues a read reclaim request for the page to the reclaim queue.

10. The memory system of claim 8, wherein the controller provides the memory device with a read reclaim request based on an order that the read reclaim request is queued to the reclaim queue.

11. The memory system of claim 8, wherein the memory device programs data of the page loaded into a memory of the controller in response to the read reclaim request into a destination page.

12. The memory system of claim 8, wherein the unit memory regions include a plurality of pages.

13. The memory system of claim 8, wherein the unit memory regions include a plurality of blocks.

14. The memory system of claim 8, wherein the unit memory regions include a plurality of page groups.

15. A memory system, comprising:
a memory device; and
a controller suitable for controlling the memory device based on read counts for a plurality of unit memory regions of the memory device,
wherein the controller determines whether a read reclaim request is provided to the memory device based on at least one of the read counts at every period, updates the read counts when there is a read reclaim request provided to the memory device during a period, and skips the update of the read counts when there is no read reclaim request provided to the memory device during the period.

16. The memory system of claim 15, wherein when a read count for a page of the memory device corresponding to a read request is equal to or greater than a threshold value, the controller queues a read reclaim request for the page to the reclaim queue.

17. The memory system of claim 15, wherein the controller provides the memory device with a read reclaim request based on an order that the read reclaim request is queued to the reclaim queue.

18. The memory system of claim 15, wherein the memory device programs data of the page loaded into a memory of the controller in response to the read reclaim request into a destination page.

19. The memory system of claim 15, wherein the unit memory regions include a plurality of pages.

20. The memory system of claim 15, wherein the unit memory regions include a plurality of blocks.

* * * * *